US005087398A

United States Patent [19]

Le Molaire et al.

[11] Patent Number: 5,087,398

[45] Date of Patent: Feb. 11, 1992

[54] PROCESS AND APPARATUS FOR COMPRESSING, AND MONITORING THE COMPRESSION OF, PULVERULENT MATERIALS AND A PRESS APPLYING SAME

[75] Inventors: Roger Le Molaire, Quartier les Chaux; Dominique H. A. Gavotto, Bourg Les Valence, both of France

[73] Assignee: ADL Automation Zone Industrielle, Malissard, France

[21] Appl. No.: 421,956

[22] Filed: Oct. 16, 1989

[30] Foreign Application Priority Data

Oct. 20, 1988 [FR] France ............................ 88 14372

[51] Int. Cl.[5] ...................... B29C 43/02; B29C 43/18

[52] U.S. Cl. ................................ 264/40.5; 264/109; 264/112; 425/149; 425/150; 425/346; 425/412

[58] Field of Search .................... 264/40.1, 40.5, 112, 264/109; 425/149, 150, 140, 141, 346, 412

[56] References Cited

U.S. PATENT DOCUMENTS

| | | | |
|---|---|---|---|
| 2,855,628 | 10/1958 | Lassman | 425/149 |
| 3,255,716 | 6/1966 | Knoechel et al. | 264/40.5 |
| 4,062,914 | 12/1977 | Hinzpeter | 264/40.1 |
| 4,121,289 | 10/1978 | Stiel | 264/40.1 |
| 4,199,539 | 4/1980 | von Herrmann et al. | 425/149 |
| 4,270,890 | 6/1981 | Ottl | 425/150 |
| 4,373,889 | 2/1983 | Brown | 425/150 |
| 4,439,129 | 3/1984 | Long et al. | 425/150 |
| 4,450,127 | 5/1984 | DeSantis et al. | 264/109 |
| 4,570,229 | 2/1986 | Breen et al. | 264/40.1 |
| 4,718,842 | 1/1988 | Labbe et al. | 425/149 |
| 5,004,576 | 4/1991 | Hinzpeter et al. | 264/40.5 |

FOREIGN PATENT DOCUMENTS

| | | |
|---|---|---|
| 0130958 | 1/1985 | European Pat. Off. . |
| 58-187223 | 11/1983 | Japan . |

*Primary Examiner*—Mary Lynn Theisen

*Attorney, Agent, or Firm*—Bacon & Thomas

[57] ABSTRACT

This invention relates to an apparatus for compressing and monitoring the force of compression detected by a sensor and/or the height of doses of pulverulent materials which are compacted in a container by a punch, wherein it comprises:

- a spindle for monitoring the force of compaction comprising:
  - a screw-nut system driven in rotation by a driving member,
  - a housing provided with at least one force sensor, interposed between the screw-nut system and the punch and adapted to be displaced in slide by the screw-nut system,
- and a circuit for servo-control of the driving member in relation with the successive measured values of the force of compaction and with a reference value of force. The invention also relates to a process for controlling the apparatus and to a press for applying same.

13 Claims, 3 Drawing Sheets

25
Fc
Hc
15
21
29
35
34
32
26a
30a
33
31
26
30
18
26b
24
31
30b
38
28
26c
39
36
27
37
13
37₁
22
41
44
45
42₁
42
43
42₂
46
48
49
11
23
52
53
54
51

PROCESS AND APPARATUS FOR COMPRESSING, AND MONITORING THE COMPRESSION OF, PULVERULENT MATERIALS AND A PRESS APPLYING SAME

FIELD OF THE INVENTION

The present invention relates to a process and apparatus for compressing, and monitoring the compression of, pulverulent materials and to a press applying same.

It concerns the compaction of pulverulent materials in a container and, in particular, to the compaction of pulverulent materials, precompacted or not, poured in doses having to be successively compacted in containers in the form of cases adapted to constitute cartridges with pyrotechnic effect, for example.

The invention concerns all the applications in which or for which pulverulent materials disposed in containers are to be packed, compacted or compressed.

BACKGROUND OF THE INVENTION

The height of the compacted material and the pressure imposed thereon constitute two criteria which perform a primordial role in the behaviour of the final products when they are subseqeuntly used. Furthermore, if these criteria, at predetermined values are not respected, these products sometimes explode during manufacture, causing considerable damage to the environment in which they are manufactured.

In an attempt to determine the height of the compacted material and the pressure imposed thereon, the prior art has proposed, particularly in Patent Appln. EP-A-0 130 958, the use of a press in the form of a vertical chassis bearing, in its upper part, a jack of which the piston rod is adapted to control a punch in vertical displacement. The press is equipped, in its lower part, with a withdrawal jack designed to control displacement of a die cooperating with the punch. The control and withdrawal jacks are associated with position sensors and with force sensors.

The jacks are displaced until the values of compaction and/or of height correspond to respective reference values of force and/or of height. When the reference values of force and/or of height are attained, the values of compaction and/or height are checked to ensure that they are included between maximum and minimum values.

One drawback of the press described hereinabove resides in the fact that it does not enable the real height of compacted material and/or the real pressure imposed on the material to be precisely known. Such uncertainties as to the real height of the compacted material and the real pressure imposed on the material do not enable final products with precise and reproducible characteristics to be obtained. Moreover, such a press, by its structure, cannot take into account the mechanical tolerances and the elasticity of the various members constituting it, with the result that the measurements made are always affected by errors.

It is precisely an object of the invention to ovecome the above drawbacks, by proposing a novel compacting apparatus adapted to know the real height of compacted material and/or the real pressure imposed on the material, accurately, so as to act on the punch in order to obtain the desired height and/or pressure.

It is another object of the invention to propose a compacting apparatus offering an easy and precise capacity of adjustment of the criteria of height and of pressure, over very broad ranges of values.

A further object of the invention is to propose a press designed to receive at least one compacting apparatus according to the invention, making it possible to carry out reproducible and precise packing-compression operations in order to obtain, by transfer machine, mass-production of cartridges of pyrotechnic character with substantially identical characteristics.

Yet another object of the invention is to propose a process for measuring and correcting the elasticity of a compacting apparatus fitted on a press.

SUMMARY OF THE INVENTION

To attain the objects set forth hereinabove, the apparatus for monitoring the compression of doses of pulverulent materials comprises:

- a spindle for monitoring the force of compaction comprising:
  - a screw-nut system driven in rotation by a driving member,
  - a housing provided with at least one force sensor, interposed between the screw-nut system and the punch and adapted to be displaced in slide by the screw-nut system,
- and a circuit for servo-control of the driving member in relation with the successive measured values of the force of compaction and with a reference value of force.

The process for controlling a compression monitoring apparatus, of the type consisting in fixing a reference value of the force of compaction and/or of the height to be attained less than a corresponding maximum value not to be exceeded, and in controlling displacement of the punch until the force of compaction or of height measured reaches the corresponding reference value, is characterized in that it consists, after the force of compaction has attained the corresponding reference value:

- in measuring the maximum force during the cycle,
- in measuring the residual force of compaction to examine the evolution thereof.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
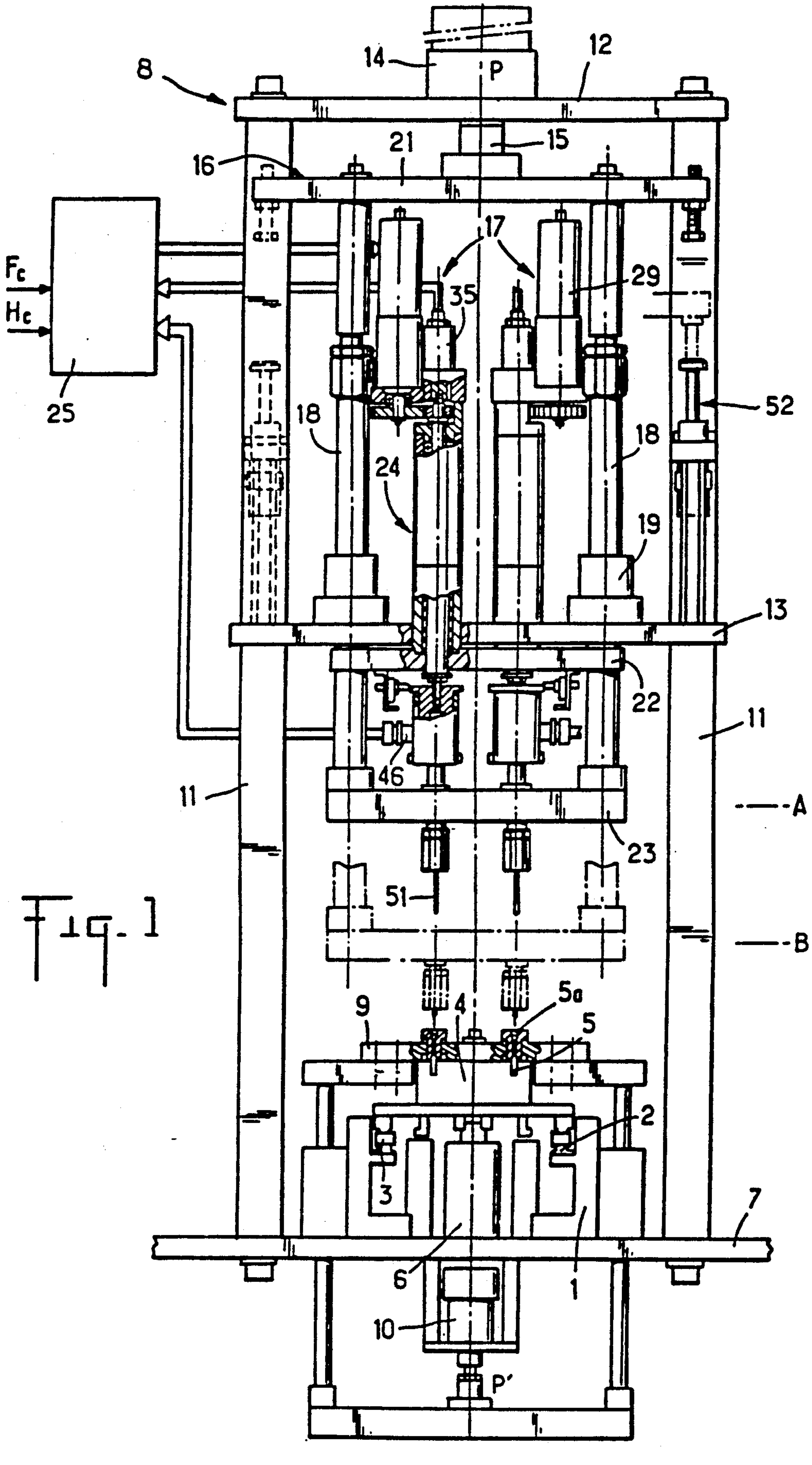
FIG. 1 is a general view in elevation of a press adapted to receive an apparatus according to the invention for monitoring the compression of pulverulent materials.
Figure 2:
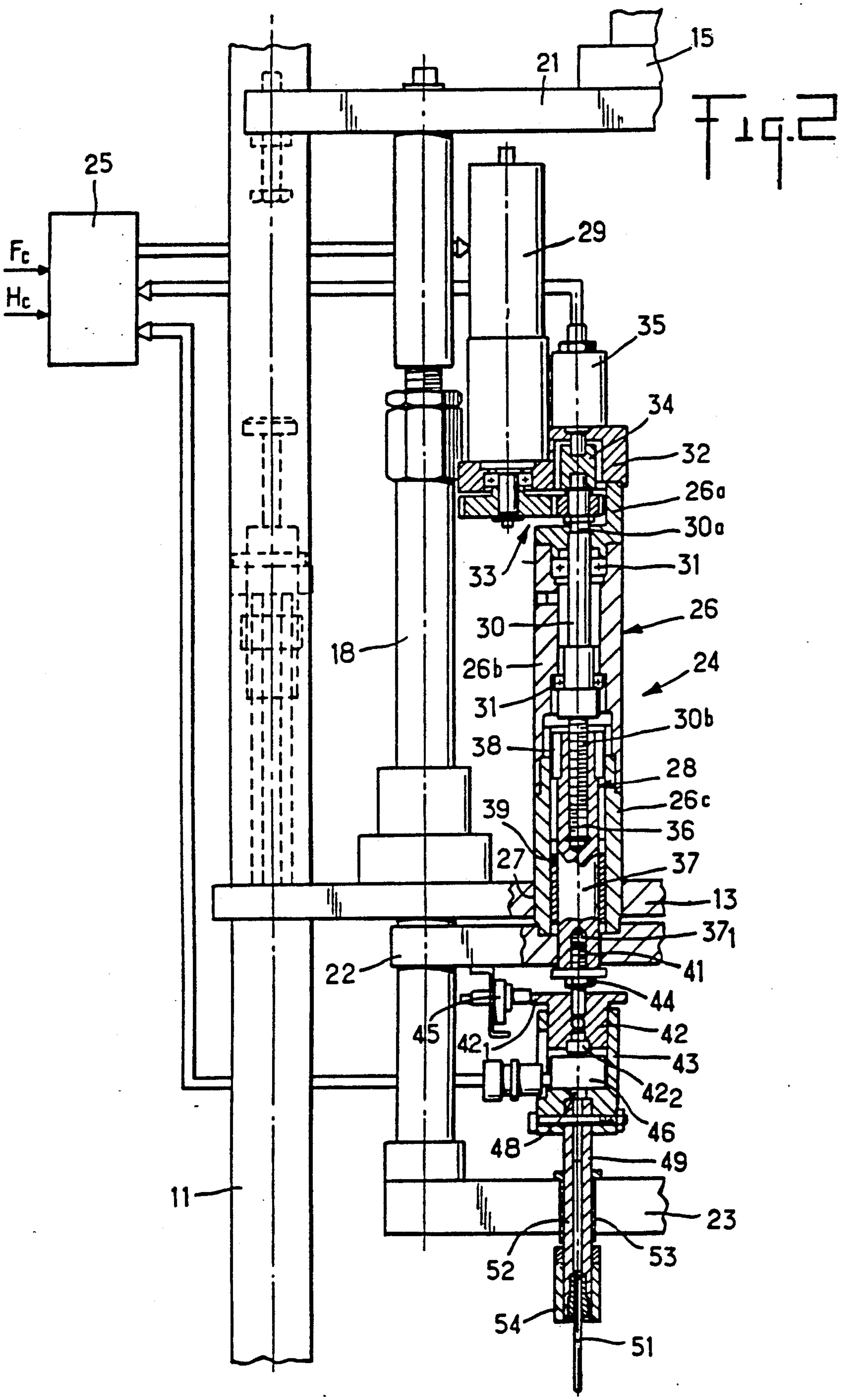
FIG. 2 is a view on a larger scale similar to FIG. 1.

Referring now to the drawings, the compaction press according to the invention, as shown in FIGS. 1 and 2, is illustrated in the form of an assembly forming part of a transfer machine. Such a machine may comprise a base structure 1 supporting guide rails 2 parallel to one another, adapted to ensure support, slide and guiding of two supple driving members 3 such as two chains of the link chain type, made in the form of two endless loops.

The drive members 3 are designed to ensure displacement of carriages 4 bearing containers, such as cases 5, in front of stations for loading pulverulent products and/or compacting stations, then towards filling, closure, unloading, etc. stations. This enumeration is given only by way of non-limiting example as a transfer machine may comprise as many stations of multiple functional character as is necessary, depending on the product to be manufactured. The transfer machine also comprises means 6 for immobilizing the carriages 4 plumb with each work station.

It must be considered that the object of the invention may also be made in the form of a simple unitary work station without forming part of a transfer machine.

The compaction press comprises a frame 7 in the form of a table, supporting the base structure 1, and a vertical chassis 8 in the form of a gantry. Table 7 guides a plate 9 in vertical slide, said plate being adapted to be displaced by a jack 10 borne by the table and performing a function of rapid approach or allowing a large opening for passage. The plate 9 supports at least one tubular filling and centering element 5*a*, intended to be positioned in line with a case 5. The chassis 8 is constituted by two uprights 11 disposed on either side of the vertical plane of symmetry P—P' of the press. The uprights 11 rise vertically from the table 7 and are connected by a horizontal upper crosspiece 12 and by an intermediate crosspiece 13 for protection. The upper crosspiece 12 supports a principal jack 14, preferably of the hydraulic, double-effect type. The jack 14 comprises a piston rod 15 oriented vertically and mounted axially and angularly fast with a vertical frame 16 ensuring support of at least one and, for example, two apparatus 17 for compression and for monitoring the force of compaction, disposed on either side of the plane of symmetry P—P'.

The vertical frame 16 is formed by two columns 18 located symmetrically with respect to the plane P—P' and guided in vertical slide by bearings 19 mounted on the intermediate crosspiece 13. The columns 18 are joined by a horizontal upper crosspiece 21, by a central plate 22 disposed below the intermediate crosspiece 13 and by an under-plate 23 whose function will be more readily understood hereinbelow.

Each apparatus 17 comprises a spindle 24 for monitoring the force of compaction and a circuit 25 for servo-controlling the spindle whose function will be more readily understood hereinbelow.

As shown more precisely in FIG. 2, the monitoring spindle 24 is constituted by a tubular cylinder 26 formed, in the example illustrated, by three parts 26*a*–26*c*. The cylinder 26 rises vertically from the central plate 22 and passes right through the intermediate crosspiece 13, through an opening 27 made in this crosspiece. The cylinder 26 is rendered fast with the central plate 22, in any suitable manner, and ensures assembly of a screw-nut system 28 driven in rotation by a driving member 29.

In the example illustrated, the screw-nut system 28 is constituted by a rod 30 guided in rotation by roller bearings 31 borne by the cylinder and adapted more particularly to support axial loads. Rod 30 is driven in rotation by the driving member 29, preferably of electrical type, of which the speed of rotation is controlled by the servo-control circuit 25. The driving member 29 is fitted on a cover 32 which is mounted on the upper terminal part 26*a* of the cylinder. For example, the driving member 29 drives rod 30 in rotation by means of a gear transmission 33. It must, of course, be considered that the driving member 29 may be mounted in axial extension of the rod 30 or may communicate its movement by a transmission different from all types known per se.

The upper terminal part 30*a* of the rod is preferably mounted fast, by a direct coupling 34, with a sensor 35 sensing position and angular displacement of the rod 30, formed, for example, by a digital coder adapted on the cover 32. The information delivered by the sensor 35 is transmitted to the servocontrol circuit 25. It should be noted that it may be provided to associate the sensor 35 with the driving member 29, taking into account, if necessary, the transformation ratio of the transmission 33.

Rod 30 comprises a lower terminal part 30*b* adapted to cooperate with a tapping 36 of a ring-nut 37 which is angularly connected to the cylinder 26 and guided in slide in the cylinder. For example, the ring-nut 37 is connected in rotation to the cylinder 26 by keys 38 and is guided in axial displacement by a bush 39.

It may, of course, be envisaged to drive the ring-nut 37 in rotation by the driving member and to connect the rod 30 angularly, so as to obtain slide of the latter.

The ring-nut 37 comprises, in its terminal part, a tapping $37_1$ adapted to receive a threaded extension 41 which is fixed to a body 42 sliding in a casing 43. The position of the body 42 is regulated vertically in relation with the screwing of the extension 41 in the ring-nut 37. The extension 41 comprises a nut 44 for blocking the body in fixed position.

Body 42 is provided with an upper flange $42_1$ adapted to cooperate with a sensor 45 fitted on the underneath of the central plate 22 ensuring end-of-stroke positioning of the body and making it possible to determine the initialization of the coder 35. The flange $42_1$ of the body defines with the casing 43 a clearance allowing axial slide of the body 42 in the casing 43. The body 42 is provided with a head $42_2$ stressing a force sensor 46 mounted in the casing The force sensor 46, for example of the gauge type, is adapted to deliver to the servo-control circuit 25 a signal in relation with the compressive stresses to which it is subjected.

The force sensor 46 is intended to be compressed by means of a cylindrical pilot 48, by a punch 51 whose general shape is determined as a function of the shape of the case 5 and/or of the effect of compression, compaction or packing having to be produced or imposed on the dose or doses of pulverulent materials.

Punch 51 is mounted in a sheath 52 which is removably fitted on the casing 43. The sheath 52 passes through the under-plate 23 whilst being guided axially by a ring 53 mounted on the under-plate and making it possible to obtain positioning of the punch 51.

The apparatus for monitoring the force of compaction, fitted on a press and described hereinabove, operates as follows:

When a dose of pulverulent material must be packed, compressed or compacted inside the case 5 into which it has been poured by any suitable means, the jack 14 is supplied so as to provoke the stroke of extension of the piston rod 15 which drives the frame 16 in its descending displacement. The frame 16, which may possibly be taken over during its descending stroke by a damping device 52 borne by the intermediate crosspiece 13, passes from a position A to a position B, shown in broken lines in FIG. 1. The stroke of the piston rod 15 is chosen so that the punch 51 exerts, or not, in position B, a pressure on the pulverulent material charged.

In order to obtain the controlled descent of the punch 51 by the apparatus 17, the servo-control circuit 25 controls rotation of the driving member 29 until the force of compaction detected by the force sensor 46 or the height of packed material measured by the coder 35, attains, respectively, a reference value of force $F_c$ or of height $H_c$, previously chosen and introduced into the circuit 25. The force reference $F_c$ is chosen to be less than a maximum value of force $F_{max}$ not to be exceeded, whilst the height reference $H_c$ is chosen to be greater than the height $H_{min}$ not to be exceeded.

It should be noted that the apparatus 17 may be employed either solely with a reference of force, solely with a reference of height, or with a reference of force and of height. In this latter operational mode, the servo-control circuit 25 controls the stop of the driving member 29 as soon as one of the reference values is attained.

The monitoring apparatus 17 thus makes it possible to obtain a precise, determined compression rate over a very wide range of values.

Furthermore, the servo-control circuit 25 is provided to measure the residual force of compaction, after the force of compaction exerted has attained the reference value of force, so as to ascertain its evolution or to control displacement of the punch until the force of compaction measured again attains the reference value of force.

Figure 3:
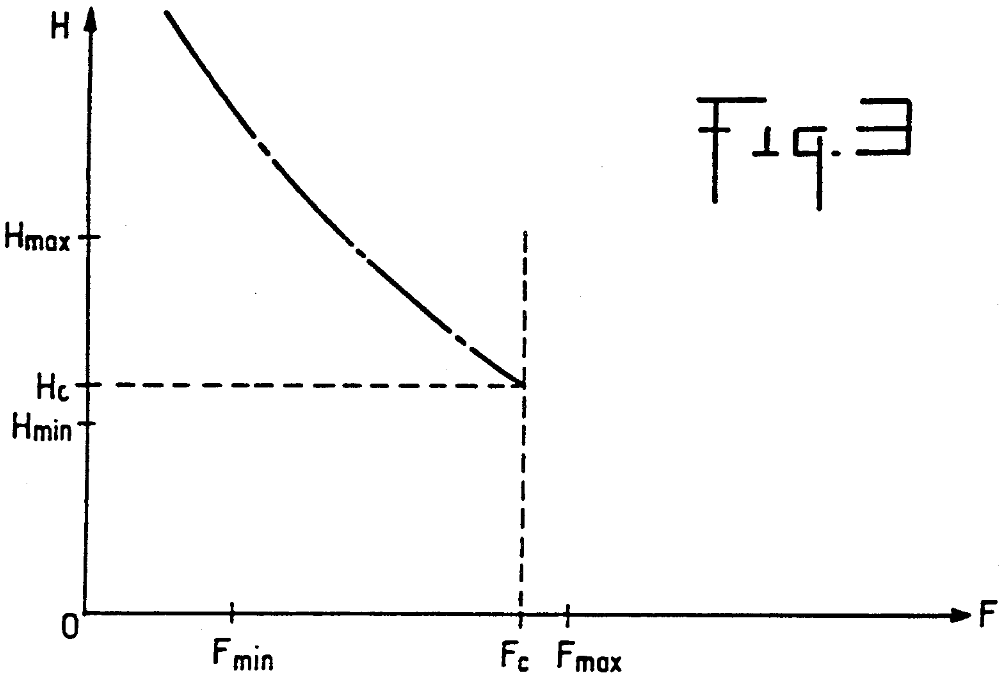
FIG. 3 is a graph illustrating the monitoring process according to the invention and showing the evolution of the height of the compacted doses, in relation with the force of compaction exerted.

As appears more precisely in FIG. 3, the servo-control circuit 25 measures, when the reference value of height is obtained, the corresponding force of compaction, so as to verify that the latter is included between maximum and minimum values $F_{max}$ and $F_{min}$. Circuit 25 also performs this function when the reference value of force is attained in order to check that the corresponding height is included between determined maximum and minimum values $H_{max}$ and $H_{min}$.

In order to compensate the defects of the screwnut system 28, a calibration is effected by proceeding with two successive measurements of height consisting in controlling the driving member, so as to bring the punch into contact with two wedges of different, known heights. The difference in height of the wedges is related to the number of pulses delivered by the coder 35 to determine the pitch of the system.

In order to improve the precision of the measurements of heights, it may be envisaged to proceed with a test to know the elasticity of the monitoring spindle fitted on a press. This test, which may be carried out during measurement of the heights described hereinabove, consists in applying the punch on an adjusting wedge, with a force of compaction greater than the maximum value of work, in measuring then in recording, in the circuit 25, the height of displacement of the punch, in relation with the force of compaction. During the measurements of height made in the course of the process of manufacture, the circuit 25 will correct the measured height by a value in relation with the corresponding recorded force.

Figure 4:
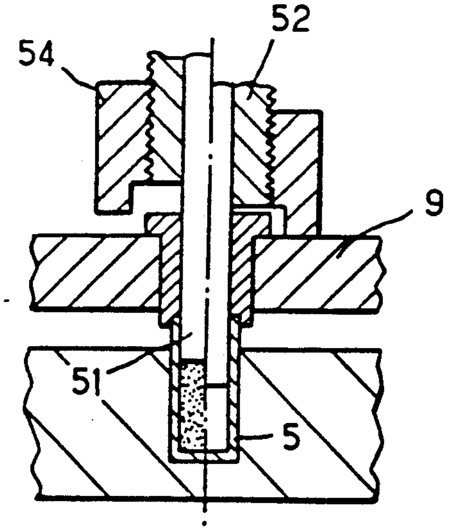
FIG. 4 shows two half views in section illustrating a characteristic detail of the invention.

In the case of several apparatus 17 being employed simultaneously on the same press, the terminal part of the sheath 52 is arranged to receive a bearing nut 54 which is employed more particularly if, during a phase of compaction, one or more punches 51 are placed in relation with a case 5 not comprising any pulverulent materials to be compacted (position shown to the right in FIG. 4). In this event, the nuts 54, associated with each punch 51 not compacting any pulverulent materials, come into abutment on the plate 9 so as to obtain a distribution of the efforts of compression on all the apparatus 17. Of course, the vertical position of the nuts 54 is suitably adjusted to allow the descent of the punches 51 by a value enabling them to perform the function of compaction of the pulverulent materials (position shown to the left in FIG. 4).

The invention is not limited to the embodiments described and shown, as various modifications may be made thereto without departing from its scope. For example, it may be envisaged to mount the monitoring spindle 24 in fixed manner and to displace the containers 5 in vertical slide.

What is claimed is:

1. Apparatus for compressing doses of pulverulent material which are compacted in a container by a punch comprising:
(a) a monitoring spindle;
(b) means operatively connecting the punch to the spindle;
(c) a screw nut drive system having a driving member to move the punch so as to compact the pulverulent material;
(d) a housing having monitoring sensor means to monitor the force of compression exerted on the pulverulent material by the punch, the housing being operatively associated with the spindle and interposed between the screw nut drive system and the punch, and adapted to be displaced by the screw nut drive system; and,
(e) servo-control circuit means operatively connected to the monitoring means and the screw nut drive means such that the force of compaction is between predetermined minimum and maximum values.

2. The apparatus of claim 1 further comprising:
(a) a second sensor means operatively associated with the spindle for sensing the position and angular displacement of the screwnut drive system; and,
(b) means operatively connecting the second sensor means to the servo-control circuit means so that the latter controls the screw nut drive system which moves the punch in relation with a reference height.

3. The apparatus of claim 1 wherein the monitoring spindle comprises:
(a) a tubular cylinder;
(b) a rod rotatably mounted in the tubular cylinder and rotated by the screw nut drive system and provided with a threaded part; and,
(c) a ring-nut slidably mounted in the tubular cylinder and operatively cooperating with the threaded part of the rod.

4. The apparatus of claim 1, wherein the monitoring spindle further comprises an additional sensor means for sensing an end-of-stroke position of the housing and the determination of the initialization of a coder associated with the screw nut drive system.

5. The apparatus of claim 3, wherein the driving member is coupled to the threaded rod by a transmission.

6. The apparatus of claim 3, wherein the driving member is mounted in axial extension with respect to the rod.

7. A compaction press for compressing doses of pulverulent materials which are compacted in a container by a punch comprising (a) a chassis rising generally vertically from a table;
(b) a jack attached to the chassis and having a generally vertically oriented extendible and retractable piston rod;
(c) a support frame slidably mounted on the chassis and operatively associated with the piston rod of the jack so as to be displaced by movement of the piston rod; and,
(d) at least one spindle assembly attached to the support frame, each spindle assembly comprising:
(i) a monitoring spindle;
(ii) means operatively connecting the punch to the spindle;
(iii) a screw nut drive system having a driving member to move the punch so as to compact the pulverulent material;
(iv) a housing having monitoring sensor means to monitor the force of compression exerted on the pulverulent material by the punch, the housing being operatively associated with the spindle and interposed between the screw nut driven system and the punch, and adapted to be displaced by the screw nut drive system; and,
(v) servo-control circuit means operatively connected to the monitoring means and the screw nut drive means such that the force of compaction is between predetermined minimum and maximum values.

8. The compaction press of claim 7, wherein the support frame further comprises a sub-plate equipped with the ring for axially guiding a sheath containing the punch.

9. The compaction press of claim 7, wherein it comprises at least two spindle assemblies, each equipped with a bearing nut mounted on a terminal part of a sheath for fitting the punch.

10. The compaction press of claim 7 wherein it further comprises: a structure for transfer of carriages bearing containers; means for immobilizing the carriages in order to position the containers in alignment with the punches; and a vertically displaceable plate supporting at least one tubular filling and recentering element adapted to be positioned in line with a container.

11. A method of controlling an apparatus for compressing doses of pulverulent material which are compacted in a container by a punch comprising the steps of:
(a) fixing a reference value of at least one of the force of compaction, and the compacted height of the does to be attained less than a corresponding maximum value;
(b) controlling the displacement of the punch until at least one of the force of compaction and the compacted height has reached the corresponding reference value;
(c) after the reference value of the force of compaction is reached, measuring the maximum force of compaction achieved during the compacting cycle;
(d) measuring the residual force of compaction to examine the evolution thereof; and,
(e) controlling displacement of the punch based upon at least one of the measured maximum force of compaction and measured residual force of compaction.

12. The method of claim 11 comprising the further step of: after measuring the residual force of compaction, controlling displacement of the punch until the measured force of compaction again reaches the reference value.

13. The method of claim 12, comprising the additional steps of:
(a) applying the punch of an adjusting wedge with a force of compaction greater than the maximum value;
(b) measuring and recording the height of displacement of the punch, in relaton with the force of compaction exerted; and,
(c) correcting, during the process of manufacture, the height measured by a value in relation with the corresponding recorded force during calibration.

* * * * *